April 7, 1964  MANABU KASHIHARA  3,127,793
INFINITELY VARIABLE SPEED CHANGE GEAR
Filed Jan. 30, 1961  3 Sheets-Sheet 1

INVENTOR.

BY

INVENTOR.

BY

April 7, 1964  MANABU KASHIHARA  3,127,793
INFINITELY VARIABLE SPEED CHANGE GEAR
Filed Jan. 30, 1961  3 Sheets-Sheet 3

INVENTOR.

BY

United States Patent Office 3,127,793
Patented Apr. 7, 1964

3,127,793
INFINITELY VARIABLE SPEED CHANGE GEAR
Manabu Kashihara, 12 Karahashi-Hanazono-cho,
Minami-ku, Kyoto, Japan
Filed Jan. 30, 1961, Ser. No. 85,687
Claims priority, application Japan Feb. 20, 1960
5 Claims. (Cl. 74—796)

This invention relates to improvements in infinitely variable speed change gears using a plurality of double cone wheels.

In this specification, I define a term "double cone wheel" as a cone wheel having two cone surfaces arranged coaxially and being positioned with the apexes of the cone surfaces on opposite sides, a term "bottom cone surface" as the one cone surface of the double cone wheel arranged in the supporting side, and a term "top cone surface" as the other cone surface of the double cone wheel.

Preceding to the present invention, I invented an infinitely variable speed change gear comprising a driving shaft and a driven shaft arranged coaxially, a cone wheel arranged coaxially with and driven by the driving shaft, a plurality of double cone wheels, the top cone surface of each double cone wheel being so arranged as to contact internally to an imaginary common cylindrical surface which has the same axis with the driving shaft, the bottom cone surface of each double cone wheel being engaged to the cone wheel driven by the driving shaft, a stationary ring engaging at a point to the top cone surface of each double cone wheel, operating means to shift the ring along the top cone surface of each double cone wheel and a common member supporting the shafts of the double cone wheels rotatably and being arranged to rotate about the axial line of the driven shaft, the double cone wheels, the cone wheel driven by the driving shaft, and the common member supporting the shafts of the double cone wheels being constrained to transmit a power from the driving shaft to the driven shaft by the stationary ring.

The infinitely variable speed change gear above mentioned can be operated by quite a small force and has a high durability and relatively simple construction. And now, as a continuance of the above mentioned speed change gear, I invented infinitely variable speed change gears which have composite construction using two groups of double cone wheels.

The main object of the present invention is to provide infinitely variable speed change gears which permit a speed regulation over a very wide range without accompanying appearance of severe pressure contact condition between the double cone wheels and their engaging members.

And according to the present invention, to accomplish the object, there is given an infinitely variable speed change gear, comprising a driving shaft and a driven shaft arranged coaxially, two groups of double cone wheels, each group containing a plurality of double cone wheels and each double cone wheel of each group having a top cone surface arranged to touch internally to a imaginary common cylindrical surface which has the same axis with the axis of the driving shaft, a ring or a member with ring-shape part engaging at one point to the top cone surface of each double cone wheel of the one group, another ring or another member with a ring-shaped part engaging at one point to the top cone surface of each double cone wheel of the other group, and operating means to shift the rings or the members with the ring-shape part simultaneously along the top cone surface of the double cone wheels, and a member or members arranged to support the shafts of the double cone wheels, the rotation of the driving shaft being transmitted to the driven shaft through the two groups of the double cone wheels and the effective radii of rotation of the double cone wheels of each group being varied to change the rotating speed of the driven shaft by the operating means.

My invention will be apparent from the following description taken with the accompanying drawings in which.

Figure 1:
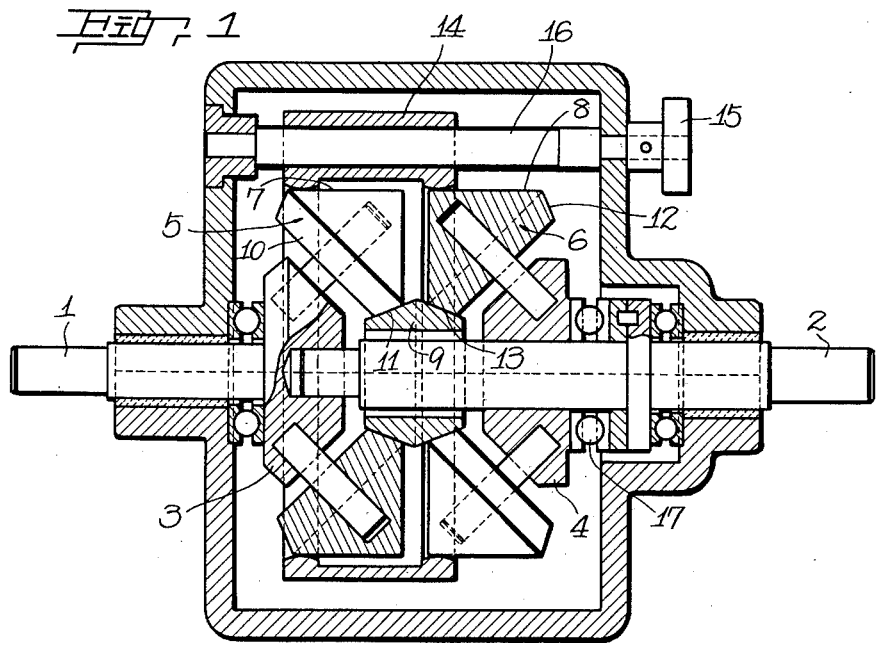
FIG. 1 is a longitudinal section view of an infinitely variable speed change gear according to the present invention, using a non-rotatable bridging member.

In FIG. 1 1 is a driving shaft and 2 is a driven shaft. The driving shaft 1 and the driven shaft 2 are arranged coaxially. 3 is a member which rotates with the driving shaft 1, and 4 is a member which rotates with the driven shaft 2. The former supports the shafts of a plurality of double cone wheels 5, and the latter supports the shafts of a plurality of double cone wheels 6. Each double cone wheel 5 arranged on the driving side rotates about an axial line which agrees with a generating line of an imaginary common cone surface. And this imaginary cone surface has an axis which coincides with the axial line of the driving shaft and the driven shaft. Each double cone wheel 6, arranged on the driven side rotates about an axial line which agrees with a generating line of another imaginary common cone surface. And though the latter common cone surface also has an axial line which coincides with the axial line of driving shaft, the latter cone surface takes an opposite direction in comparison with the former cone surface.

The top cone surface 7 of each double cone wheel 5 arranged on the driving side is so arranged as to touch internally at one generating line to an imaginary cylindrical surface which has the same axis with the axis of the driving shaft. And the top cone surface 8 of each double cone wheel 6 arranged on the driven side is so arranged as to touch internally at one generating line to an imaginary cylindrical surface which has the same axis with the axis of driven shaft. The equalization of the diameter of the former cylindrical surface and the diameter of the latter cylindrical surface is preferable to simplify the construction of the speed change gear according to the present invention. 9 is a power transmitting wheel or a power transmitting ring the inner diameter of which is—as seen from FIGS. 1 and 2—greater than the diameter of driven shaft 2, which ring is arranged coaxially with the driven shaft and has two cone surfaces 11, 13, of which the one cone surface 11 engages with the bottom cone surface 10 of each double cone wheel 5 and the other cone surface 13 engages with the bottom cone surface 12 of each double cone wheel 6. 14 is a non-rotatable bridging member or a rail member. This member has two ring-shape portions, of which the one ring-shape portion contacts at one point to the top cone surface 7 of each double cone wheel 5 on the driving side and the other ring-shape portion contacts at one point to the top cone surface 8 of the double cone wheel 6 on the driven side. As the top cone surface 7 and the top cone surface 8 touch internally at one generating line of the imaginary common cylindrical surface, the bridging member 14 can be shifted axially maintaining the engagements to the top cone surfaces 7 and the top cone surfaces 8. The bridging member 14 is engaged in the feeding screw rod 16 extending to the axial direction and is shifted by turning the grip handle 15 fixed on the end of the rod 16. 17 is a "ball and cam engaging device" arranged between the member 4 and the driven shaft 2. When the member 4 rotates, balls in the device 17 act as wedge members between opposed cam surfaces. Thus the device 17 produces engaging pressures between the double cone wheels and their engaging members, and at the same time it fastens the member 4 to the driven shaft 2. As the device 17 varies the thrusting force to be produced according to the torque to be transmitted, an automatic regulation of pressure contact condition between the double cone wheels and their engaging members may be possible by the use of this device 17, but when a speed change gear is used in a light load, the automatic regulation of pressure contact condition is not necessary, and the device 17 may be substituted to an engaging device using a coiled spring.

Assuming the ratio of effective radii of rotation and the amounts of rotation of the driving shaft 1 as follows, the amount of rotation of the driven shaft is shown by the following Formula 1.

N: Amount of rotation of the driving shaft 1

C:

$$C = \frac{\text{effective radius of the top cone surface 7}}{\text{effective radius of the bridging member 14 for the top cone surface 7}}$$

C varies according to the position of the bridging member 14.

c:

$$c = \frac{\text{effective radius of the top cone surface 11 or 13}}{\text{effective radius of the bottom cone surface 10 or 12}}$$

C':

$$C' = \frac{\text{effective radius of the top cone surface 8}}{\text{effective radius of the bridging member 14 for the top cone surface 8}}$$

C' also varies according to the position of the bridging member 14, but C' is a simple linear function of C.

N': Amount of rotation of the driven shaft 2

$$N' = \frac{1 + \frac{c}{C}}{1 + \frac{c}{C'}} \qquad (1)$$

$$\frac{dN'}{dC} = \frac{-\left[\frac{c}{C^2}\left(1 + \frac{1}{C'}\right) + \frac{c}{C'^2}\left(1 + \frac{c}{C}\right)\right]}{\left(1 + \frac{c}{C'}\right)^2} 0 \qquad (2)$$

As seen in the Formula 1, the rotating speed of the driven shaft 2 is positive and always has a finite value. And as seen by the Formula 2, the rotating speed of the driven shaft 2 increases as the value of C decreases. The value of C increases when the bridging member 14 is moved to the left hand direction and decreases when the bridging member 14 is moved to the right hand direction.

Figure 2:
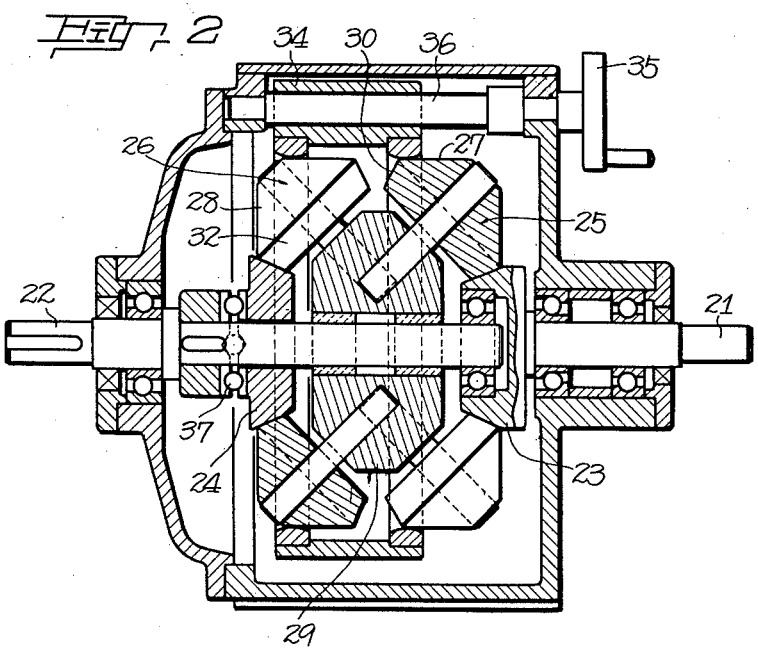
FIG. 2 is a longitudinal section view of another infinitely variable speed change gear according to the present invention, using also a non-rotatable bridging member but having different supporting system of the double cone wheels in comparison with the supporting system of the double cone wheels shown in FIG. 1.

In the infinitely variable speed change gear according to the present invention shown in FIG. 2, a driving shaft 21, a driven shaft 22, a plurality of double cone wheels 25, a plurality of double cone wheels 26, top cone surfaces 27 and 26, bottom cone surfaces 30 and 32, a bridging member 34, a handle 35, a feeding screw rod 36 and a "ball and cam engaging device" 37 are similar members or parts in comparison with the members or parts shown in FIG. 1. In this form the shafts of the double cone wheels 25 on the driving side and the shafts of the double cone wheels 26 on the driven side are both supported by a member 29 which is arranged coaxially with the driven shaft 22. The bottom cone surfaces 30 of the double cone wheels 25 on the driving side are engaged to a cone wheel 23, and the bottom cone surfaces 32 of the double cone wheels 26 on the driven side are engaged to a cone wheel 24 on the driven side. The cone wheel 23 and the cone wheel 24 are arranged to rotate with the driving shaft 21 and the driven shaft 22, respectively.

Assuming the ratio of effective radii of rotation and the amount of rotation of the driving shaft 21 as follows, the amount of rotation of the driven shaft 22 can be represented by the following Formula 3.

N: Amount of rotation of the driving shaft 21

D:

$$D = \frac{\text{effective radius of the top cone surface 27}}{\text{effective radius of the bridging member 34 for the top cone surface 27}}$$

D varies according to the position of the bridging member 34.

d:

$$d = \frac{\text{effective radius of the bottom cone surface 30}}{\text{effective radius of the cone wheel 23}}$$

D':

$$D' = \frac{\text{effective radius of the top cone surface 28}}{\text{effective radius of the bridging member 34 for the top cone surface 28}}$$

D' also varies according to the position of the bridging member 34, but D' is a simple linear function of D.

d':

$$d' = \frac{\text{effective radius of the bottom cone surface 32}}{\text{effective radius of the cone wheel 24}}$$

N': Amount of rotation of the driven shaft 22

$$N' = \frac{1 + \frac{d'}{D'}}{1 + \frac{d}{D}} \qquad (3)$$

As the Formula 3 shows, the infinitely variable speed change gear has a characteristics similar to that of the infinitely variable speed change gear shown in FIG. 1.

Figure 3:
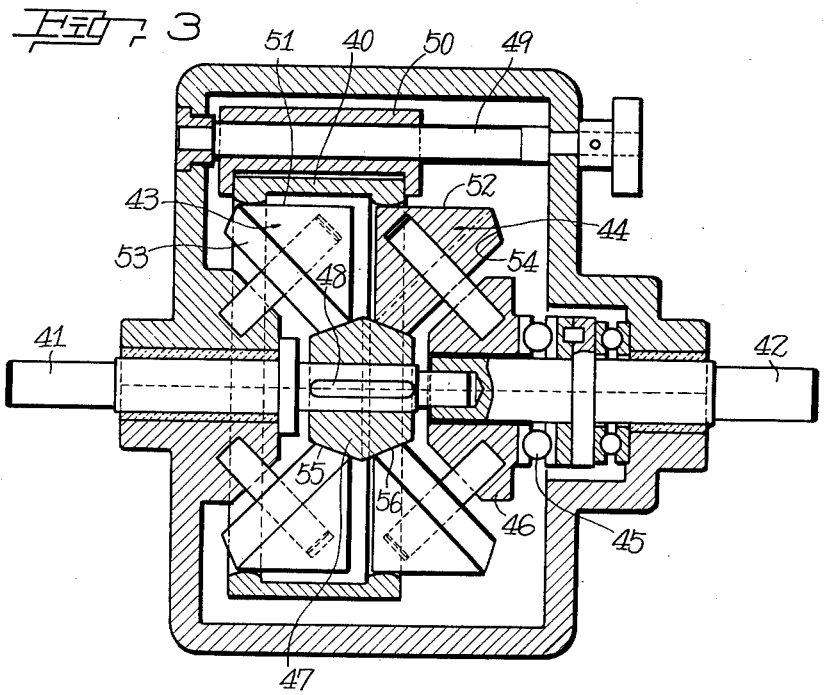
FIG. 3 is a longitudinal section view of another infinitely variable speed change gear according to the present invention, using a rotatable bridging member.

The infinitely variable speed change gear shown in FIG. 3 is one in which a bridging member 40 rotates. In this type of speed change gear according to the present invention, the casing of the device supports the shafts of the double cone wheels 43 on the driving side, and the shafts of the double cone wheels 44 on the driven side are supported by a member 46. The relations between the driven shaft 42, a "ball and cam engaging devive" 45, the supporting member 46 and the double cone wheels 44 are the same as those of the corresponding members shown in FIG. 1. But in this type, the double cone wheels 43, 44 engage at their bottom cone surfaces 53, 54 to a cone wheel 47 with two cone surfaces 55, 56, which is mounted and keyed to the driving shaft 41. A key 48 to stop the relative rotation between the driving shaft 41 and the cone wheel 47 is a feather key to permit the transmission of the thrusting force the double cone wheels 43 to the double cone wheels 44. The feeding screw rod 49 engages to a nut 50 with a forked portion, and the bridging member 40 is engaged to this forked portion.

Assuming the effective radii of rotation and the amounts of rotation as follows, the amount of rotation of the driven shaft 42 can be represented by the Formula 4 undermentioned.

N: Amount of rotation of the driving shaft 41
E:

$$E = \frac{\text{effective radius of the top cone surface 51 of the double cone wheel 43}}{\text{effective radius of the bridging member 40 for the top cone surface 51}}$$

E varies according to the position of the bridging member 40.

e:

$$e = \frac{\text{effective radius of the bottom cone surface 53}}{\text{effective radius of the cone wheel 47 for the bottom cone surface 53}}$$

e':

$$e' = \frac{\text{effective radius of the bottom cone surface 54}}{\text{effective radius of the cone wheel 47 for the bottom cone surface 54}}$$

$$E' = \frac{\text{effective radius of the top cone surface 52 of the double cone wheel 44}}{\text{effective radius of the bridging member 40 for the top cone surface 52}}$$

N': Amount of rotation of the driven shaft 42

$$N' = \frac{1 - \frac{e'}{e} \cdot \frac{E}{E'}}{1 + \frac{e'}{E'}} \quad (4)$$

N' is equal to zero, when $E/E'$ is equal to $e/e'$. Thus, this type of infinitely variable speed change gear enables the driven shaft 42 to rotate both positive and negative directions.

Figure 4:
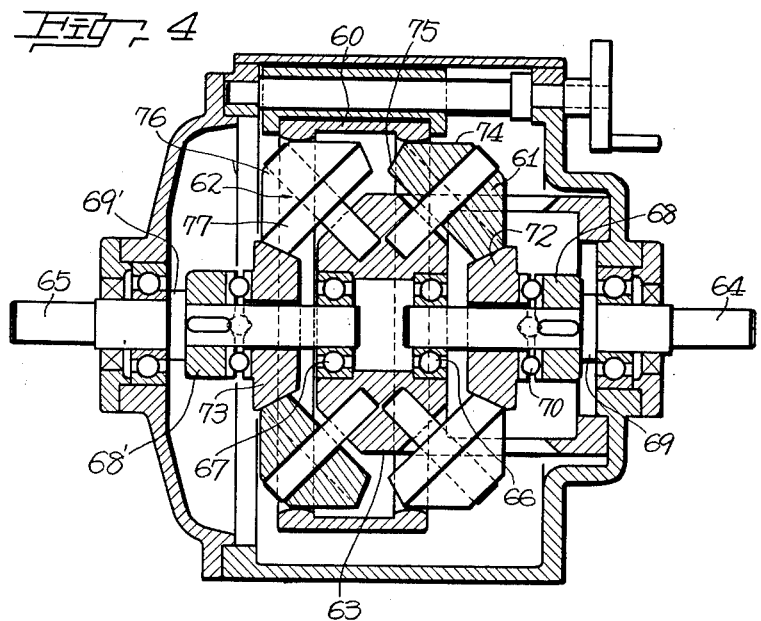
FIG. 4 is a longitudinal section view of another infinitely variable speed change gear, which uses also a rotatable bridging member but having different supporting system of the double cone wheels in comparison with the supporting system of the double cone wheels shown in FIG. 3.

The infinitely variable speed change gear shown in FIG. 4 has also a rotatable bridging member 60 and the shifting mechanism is the same as that shown in FIG. 3. In this type, the shafts of the double cone wheels 61 on the driving side and the shafts of the double cone wheels 62 on the driven side are both supported by a stationary member 63 and this member 63 supports the end of the driving shaft 64 and the end of the driven shaft 65 rotatably by means of a bearing 66 and 67. A member 68 is keyed on the driving shaft 64 and abutted to a thrust receiving collar. A "ball and cam engaging device" 70 is arranged between a cone wheel 72 mounted on the driving shaft 64 and the member 68, and when the driving shaft 64 rotates, the device 70 fixes the cone 72 to the driving shaft. A member 68', a collar 69' and a "ball and cam engaging device" 70' is arranged on the driven shaft 65 similarly and when a cone wheel 73 on the driven shaft 65 rotates, the cone wheel 73 rotates with the driven shaft 65.

Assuming the effective radii of rotation and the amounts of rotation as follows, the amount of rotation of the driving shaft 65 can be represented by the Formula 5 undermentioned.

N: Amount of rotation of the driving shaft 64
f:

$$f = \frac{\text{effective radius of the cone wheel 72}}{\text{effective radius of the bottom cone surface 74 of the double cone wheel 61}}$$

F:

$$F = \frac{\text{effective radius of the top cone surface 75 of the double cone wheel 61}}{\text{effective radius of the bridging member for the double cone wheel 61}}$$

F':

$$F' = \frac{\text{effective radius of the top cone surface 76 of the double cone wheel 62}}{\text{effective radius of the bridging member for the double cone wheel 61}}$$

f':

$$f' = \frac{\text{effective radius of the cone wheel 73}}{\text{effective radius of the bottom cone surface 77 of the double cone wheel 62}}$$

N': Amount of rotation of the driven shaft $$N' = \frac{f}{f'} \cdot \frac{F}{F'} \quad (5)$$

Figure 5:
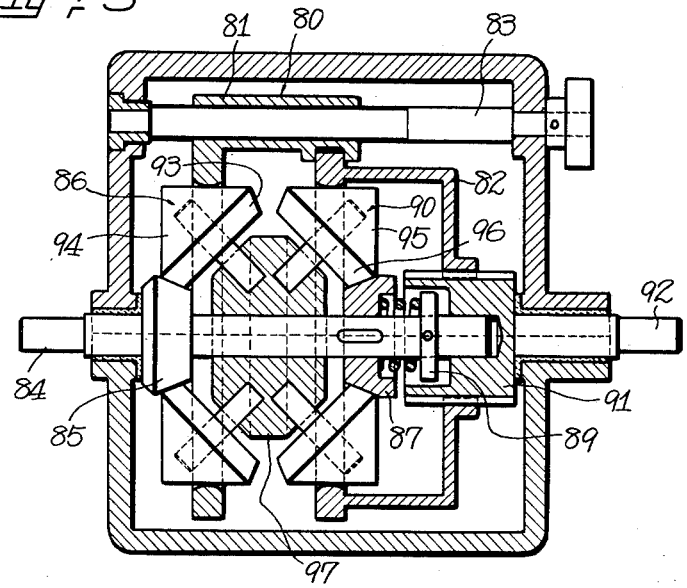
FIG. 5 is a longitudinal section view of another infinitely variable speed change gear according to the present invention using a bridging member consisting of a non-rotatable part and a rotatable part.

The infinitely variable speed change gear shown in FIG. 5 according to the present invention has a bridging member 80 of a mixed type. This bridging member 80 consists of a non-rotatable member 81 and a rotatable member 82, and the feeding screw rod 83 engages to the non-rotatable member 81. A cone wheel 85 is fixed on the driving shaft 84, and engages to the bottom cone surfaces of the double cone wheels 86 on the driving side. Another cone wheel 87 which engages to the double cone wheels 90 on the driven side is mounted on and keyed to the driving shaft 84. A coiled spring 88 is arranged between the cone wheel 87 and a collar 89 on the driving shaft 84 and produces a thrusting force the shafts of the double cone wheels 86 and the shafts of the double cone wheels 90 are both supported by a member 97 which is rotatably mounted on the driving shaft. The rotatable member 82 has a splined portion and this portion is engaged to a splined portion of a member 91 fixed on the driven shaft 92. The member 91 supports also the end of the driving shaft 84 rotatably.

Assuming the effective radii and the amounts of rotation as follows, the amount of rotation of the driven shaft 92 is shown by the Formula 6 undermentioned.

N: Amount of rotation of the driving shaft 84
g:

$$g = \frac{\text{effective radius of the bottom cone surface 93 of the double cone wheel 86}}{\text{effective radius of the cone wheel 85}}$$

G:

$$G = \frac{\text{effective radius of the top cone surface 94 of the double cone wheel 86}}{\text{effective radius of the non-rotatable member 81}}$$

G':

$$G' = \frac{\text{effective radius of the top cone surface 95 of the double cone wheel 90}}{\text{effective radius of the rotatable member 82}}$$

g':

$$g' = \frac{\text{effective radius of the bottom cone surface 96 of the double cone wheel 90}}{\text{effective radius of the cone wheel 87}}$$

N: Amount of rotation of the driven shaft 92

$$N' = G - \frac{g}{g'} G' \cdot \frac{N}{G - g} \quad (6)$$

Figure 6:
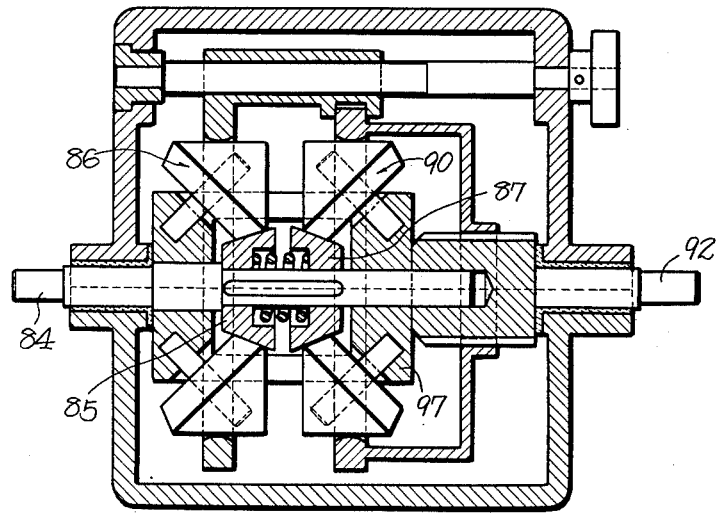
FIG. 6 is a longitudinal section view of a modified form of the infinitely variable speed change gear shown in FIG. 5.

The infinitely variable speed change gear shown in FIG. 6 is a modification of the speed change gear shown in FIG. 5, and in this form, the member 97 of the speed change gear shown in FIG. 5 is brought out to the outsides of the cone wheels 85, 87, and the spring 88 is brought into the space between the cone wheel 85 and cone wheel 87 in FIG. 5. In FIG. 6, corresponding parts are shown by the same numeral. The amount of rotation of the driven shaft 92 can be calculated by the Formula 6 above mentioned.

What I claim is:

1. An infinitely variable speed change gear comprising a driving shaft and a driven shaft arranged coaxially, two groups of double cone wheels provided with shafts, each group containing a plurality of double cone wheels and each double cone wheel of each group having a top cone surface arranged to touch internally at one generating line to an imaginary common cylindrical surface which has the same axis with the axis of the driving shaft and a bottom cone surface, a member arranged to rotate with the driving shaft, the shafts of the double cone wheels of the one group being supported by the above said member, a member arranged to rotate with the driven shaft, the shafts of the double cone wheels of the other group being supported by the last mentioned member, a wheel with two cone surfaces, and having an internal diameter greater than the diameter of the driven shaft, arranged normally coaxially with the driven shaft, the one cone surface of the wheel being engaged to the bottom cone surface of the double cone wheel of the one group, and the other cone surface of the wheel being engaged to the bottom cone surface of the double cone wheel of the other group, a non-rotatable bridging member with two ring-shape parts, of which the one ring-shaped part engaging at one point to the top cone surface of each double cone wheel of the one group and the other ring-shaped part engaging at one point to the top cone surface of each double cone wheel of the other group and operating means to shift the bridging member along the top cone surfaces of the double cone wheels.

2. An infinitely variable speed change gear, comprising a driving shaft and a driven shaft arranged coaxially, two groups of double cone wheels provided with shafts, each group containing a plurality of double cone wheels and each double cone wheel of each group having a top cone surface arranged to touch internally at one generating line to an imaginary common cylindrical surface which has the same axis with the axis of the driving shaft and a bottom cone surface, a cone wheel arranged to rotate with the driving shaft and engaged to the bottom cone surface of the double cone wheels of the one group, another cone wheel arranged to rotate with the driven shaft and engaged to the bottom cone surface of the double cone wheels of the other group, a member arranged coaxially with the driven shaft and supporting the shafts of double cone wheels of the two groups, a non-rotatable bridging member with two ring-shape parts, of which the ring-shaped part engaging at one point to the top cone surface of each double cone wheel of the one group and the other ring-shaped part engaging at one point to the top cone surface of each double cone wheel of the other group, and operating means to shift the bridging member along the top cone surfaces of the double cone wheels.

3. An infinitely variable speed change gear, comprising a driving shaft and a driven shaft arranged coaxially, two groups of double cone wheels provided with shafts, each group containing a plurality of double cone wheels and each double cone wheel of each group having a top cone surface arranged to touch internally at one generating line to an imaginary common cylindrical surface which has the same axis with the axis of the driving shaft and a bottom cone surface, a wheel having two cone surfaces and arranged to rotate with the driven shaft, the one cone surface of the wheel being engaged to the bottom cone surface of the double cone wheels of the one group, and the other cone surface of the cone wheel being engaged to the bottom cone surface of the double cone wheels of the other group, a supporting wheel member arranged to rotate with the driving shaft and supporting the shafts of the double cone wheels of the one group, a stationary member or casing supporting the shafts of the double cone wheels of the other group, a rotatable bridging member with two ring-shape parts, of which the one ring-shaped part engaging at one point to the top cone surface of each double cone wheel of the one group and the other ring-shaped part engaging at one point to the top cone surface of each double cone wheel of the other group, and operating means to shift the bridging member along the top cone surfaces of the double cone wheels.

4. An infinitely variable speed change gear, comprising a driving shaft and a driven shaft arranged coaxially, two groups of double cone wheels provided with shafts, each group containing a plurality of double cone wheels and each double cone wheel of each group having a top cone surface arranged to touch internally at one generating line to an imaginary common cylindrical surface which has the same axis with the axis of the driving shaft, a cone wheel arranged to rotate with the driving shaft and engaging to the bottom cone surface of the double cone wheels of the one group, another cone wheel arranged to rotate with the driven shaft and engaging to the bottom cone surface of the double cone wheels of the other group, a stationary member supporting the shafts of the double cone wheels of the two groups, a rotatable bridging member with two ring-shaped parts, of which the one ring-shaped part engaging at one point to the top cone surface of each double cone wheel of the one group and the other ring-shaped part engaging at one point to the top cone surface of each double cone wheel of the other group, and operating means to shift the bridging member along the top cone surfaces of the double cone wheels.

5. An infinitely variable speed change gear, comprising a driving shaft and a driven shaft arranged coaxially, two groups of double cone wheels provided with shafts, each group containing a plurality of double cone wheels and each double cone wheel of each group having a top cone surface arranged to touch internally at one generating line to an imaginary common cylindrical surface which has the same axis with the axis of the driving shaft and a bottom cone surface, two cone wheels arranged to rotate with the driven shaft, of which the one cone wheel engaging to the bottom cone surface of the double cone wheels of the one group and the other cone wheel engaging to the bottom cone surface of the double cone wheels of the other group, a member arranged coaxially with the driven shaft and supporting the shafts of the double cone wheels of the two groups, a bridging member which consists of a non-rotatable member and a rotatable member, each member being given a ring-shaped part, and the non-rotatable member being engaged at one point to the top cone surface of each double cone wheel of the one group and the rotatable member being engaged to the top cone surface of each double cone wheel of the other group, operating means to shift the bridging member along the top cone surfaces of the double cone wheels, and means to transmit the rotation of the said rotatable member to the driven shaft.

References Cited in the file of this patent

UNITED STATES PATENTS 2,209,497    Winger et al.             July 30, 1940

FOREIGN PATENTS 214,866    Australia               May 2, 1958
201,960    Austria                 Feb. 10, 1959
212,658    Austria                 Dec. 27, 1960